(12) United States Patent
Chang et al.

(10) Patent No.: US 10,298,053 B2
(45) Date of Patent: May 21, 2019

(54) INTERCONNECTING SOLAR RECHARGEABLE BATTERIES IN A PLANAR OR VERTICAL ARRANGEMENT

(71) Applicant: SolarLego Inc., San Jose, CA (US)

(72) Inventors: David Chang, San Jose, CA (US); Stephen S. Coates, San Francisco, CA (US)

(73) Assignee: SolarLego Inc., San Jose, CA (US)

( * ) Notice: Subject to any disclaimer, the term of this patent is extended or adjusted under 35 U.S.C. 154(b) by 563 days.

(21) Appl. No.: 14/956,734

(22) Filed: Dec. 2, 2015

(65) Prior Publication Data

US 2016/0156221 A1 Jun. 2, 2016

Related U.S. Application Data

(63) Continuation of application No. 13/667,625, filed on Nov. 2, 2012, now Pat. No. 9,231,422, which is a
(Continued)

(51) Int. Cl.
| | |
|---|---|
| *H01M 10/46* | (2006.01) |
| *H01M 10/42* | (2006.01) |
| *H02J 7/35* | (2006.01) |
| *H02J 7/00* | (2006.01) |
| *H01M 14/00* | (2006.01) |

(52) U.S. Cl.
CPC ......... *H02J 7/355* (2013.01); *H01M 10/4207* (2013.01); *H01M 10/465* (2013.01); *H02J 7/0014* (2013.01); *H02J 7/0021* (2013.01); *H02J 7/0026* (2013.01); *H02J 7/0045* (2013.01); *H01M 14/005* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,740,431 | A | * | 4/1988 | Little | ............... H01M 10/465 136/244 |
| 5,701,067 | A | * | 12/1997 | Kaji | ..................... A45C 15/00 136/293 |

(Continued)

*Primary Examiner* — Jay Patidar
(74) *Attorney, Agent, or Firm* — Van Pelt, Yi & James LLP

(57) ABSTRACT

Techniques for connecting a plurality of solar rechargeable batteries in a planar arrangement or vertical arrangement are disclosed, wherein the plurality of solar rechargeable batteries are electrically connected, wherein each of the plurality of solar rechargeable batteries includes an integrated solar cell and a plurality of interconnections for electrically connecting with the plurality of solar rechargeable batteries in series and in parallel, and wherein the plurality of interconnections include a combination of male and female connectors that allow for electrically connecting the plurality of solar rechargeable batteries in series and in parallel; determining whether the plurality of solar rechargeable batteries are connected in series or in parallel; balancing the load of the plurality of solar rechargeable batteries so that each of the plurality of solar rechargeable batteries is equally charged; and wherein each of the plurality of solar rechargeable batteries can be connected standalone to an electrically powered device to power the electrically powered device.

17 Claims, 11 Drawing Sheets

Related U.S. Application Data continuation of application No. 12/284,712, filed on Sep. 23, 2008, now Pat. No. 8,324,857.

(56) References Cited

U.S. PATENT DOCUMENTS

| | | | | |
|---|---|---|---|---|
| 6,608,464 | B1* | 8/2003 | Lew | B60K 1/04 320/107 |
| 6,884,934 | B2* | 4/2005 | Tsuzuki | H01L 31/02021 136/244 |
| 2003/0011343 | A1* | 1/2003 | Hobelsberger | H01M 10/465 320/101 |
| 2007/0126399 | A1* | 6/2007 | Benckenstein, Jr. | H02J 7/0016 320/119 |
| 2007/0216351 | A1* | 9/2007 | Seki | H01M 10/44 320/112 |
| 2008/0246439 | A1* | 10/2008 | Tsui | H02J 7/0055 320/137 |
| 2009/0013521 | A1* | 1/2009 | Okumura | H01M 10/44 29/730 |
| 2009/0072793 | A1* | 3/2009 | Chang | B60L 11/1809 320/134 |
| 2009/0258286 | A1* | 10/2009 | Ho | H01M 2/0245 429/100 |
| 2009/0302681 | A1* | 12/2009 | Yamada | H02J 7/35 307/46 |
| 2010/0013428 | A1* | 1/2010 | Shin | H02J 7/35 320/101 |
| 2011/0074355 | A1* | 3/2011 | Dao | H01M 10/441 320/118 |

\* cited by examiner

INTERCONNECTING SOLAR RECHARGEABLE BATTERIES IN A PLANAR OR VERTICAL ARRANGEMENT

CROSS REFERENCE TO OTHER APPLICATIONS

This application is a continuation of U.S. patent application Ser. No. 13/667,625, entitled INTERCONNECTING SOLAR RECHARGEABLE BATTERIES, filed Nov. 2, 2012, which is a continuation of U.S. patent application Ser. No. 12/284,712, now U.S. Pat. No. 8,324,857, entitled PORTABLE STACKABLE SOLAR BATTERIES, filed Sep. 23, 2008, both of which are incorporated herein by reference for all purposes.

BACKGROUND OF THE INVENTION

A solar cell, also referred to as a photovoltaic (PV) cell, is a device that converts solar energy into electricity by the photovoltaic effect, which captures energy from sunlight and/or other light sources (e.g., artificial light, such as from indoor lighting in homes and offices). Assemblies of solar cells are sometimes used to make solar modules, which may in turn be linked in photovoltaic arrays.

Solar cells have many applications. For example, individual cells are used for powering small devices such as electronic devices (e.g., calculators with integrated solar cells and watches with integrated solar cells).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
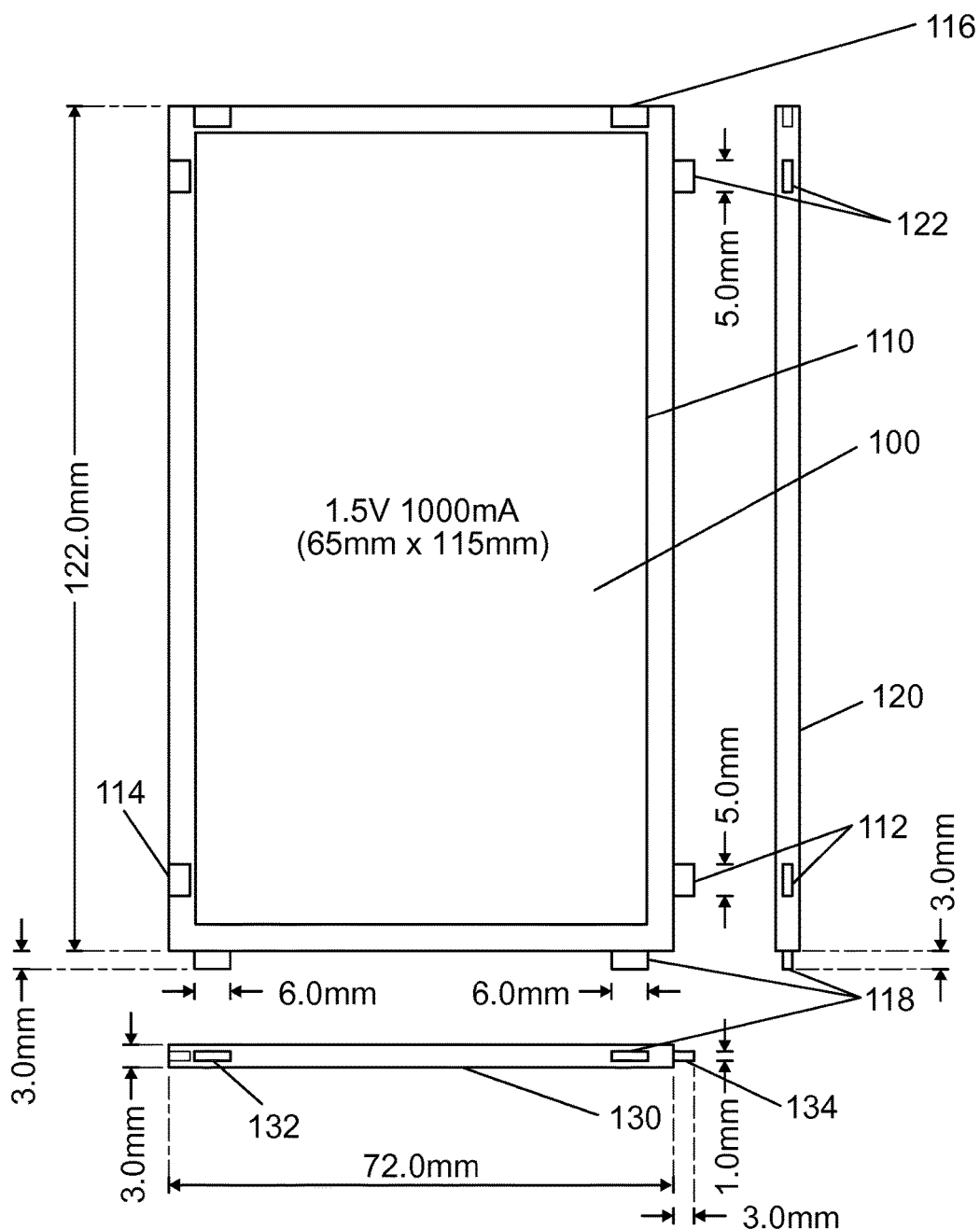
FIG. 1 is a block diagram illustrating an embodiment of a solar rechargeable battery illustrating a top view, a side view, and a bottom side view.

FIG. 1 is a block diagram illustrating an embodiment of a solar rechargeable battery 100 illustrating a top view 110, a side view 120, and a bottom side view 130. As shown in FIG. 1, solar battery 100 is a 1.5V, 1000 mA battery, which has dimensions of 72 mm×122 mm and a depth of 3.0 mm (e.g., a size that is approximately the size of an International Organization for Standardization (ISO) standard credit card size package). Referring to top view 110, solar battery 100 includes male electrical connectors, including, as shown, side male connector 112 (e.g., dimensions as shown of 5.0 mm) and bottom side male connector 118 (e.g., dimensions as shown of 6.0 mm). Solar battery 100 also includes female electrical connectors, including, as shown, side female connector 114 and top side female connector 116. As shown, solar battery 100 includes two female connectors on the left side, two female connectors on the top side, two male connectors on the right side, and two male connectors on the bottom side. As shown, side view 120 of solar battery 100 illustrates male connectors 112, 118, and 122. Bottom side view 130 of solar battery 100 illustrates male electrical connectors 118, 132, and 134 (e.g., dimensions of male electrical connector 134 as shown of 3.0 mm in length and 1.0 mm in width). In one embodiment, a different combination and/or number of male and female (electrical) connectors are provided for solar battery 100. In one embodiment, solar battery 100 is a nickel metal hydride (NiMH) battery, a nickel cadmium (NiCd) battery, or a lithium polymer (Li-polymer) battery. In one embodiment, solar battery 100 can be interconnected with other solar batteries in series or in parallel. In one embodiment, solar battery 100 can be stacked and electrically connected with other batteries with a selectable voltage output (e.g., 3.6 V for a cell phone, 18-21 volts for a laptop computer, 110V/240V, etc.) and with various device connections (e.g., device output connections for powering various electrical devices, such as a computer/laptop, cell phone, PDA, DVD, MP3/4 player, or any other electrical device). For example, solar battery 100 can be interconnected (or tiled) with other batteries, where the batteries can be a flexible material for efficient interconnections for adding charging capacity to the overall system in a manner suitable for a variety of environments.

Figure 2:
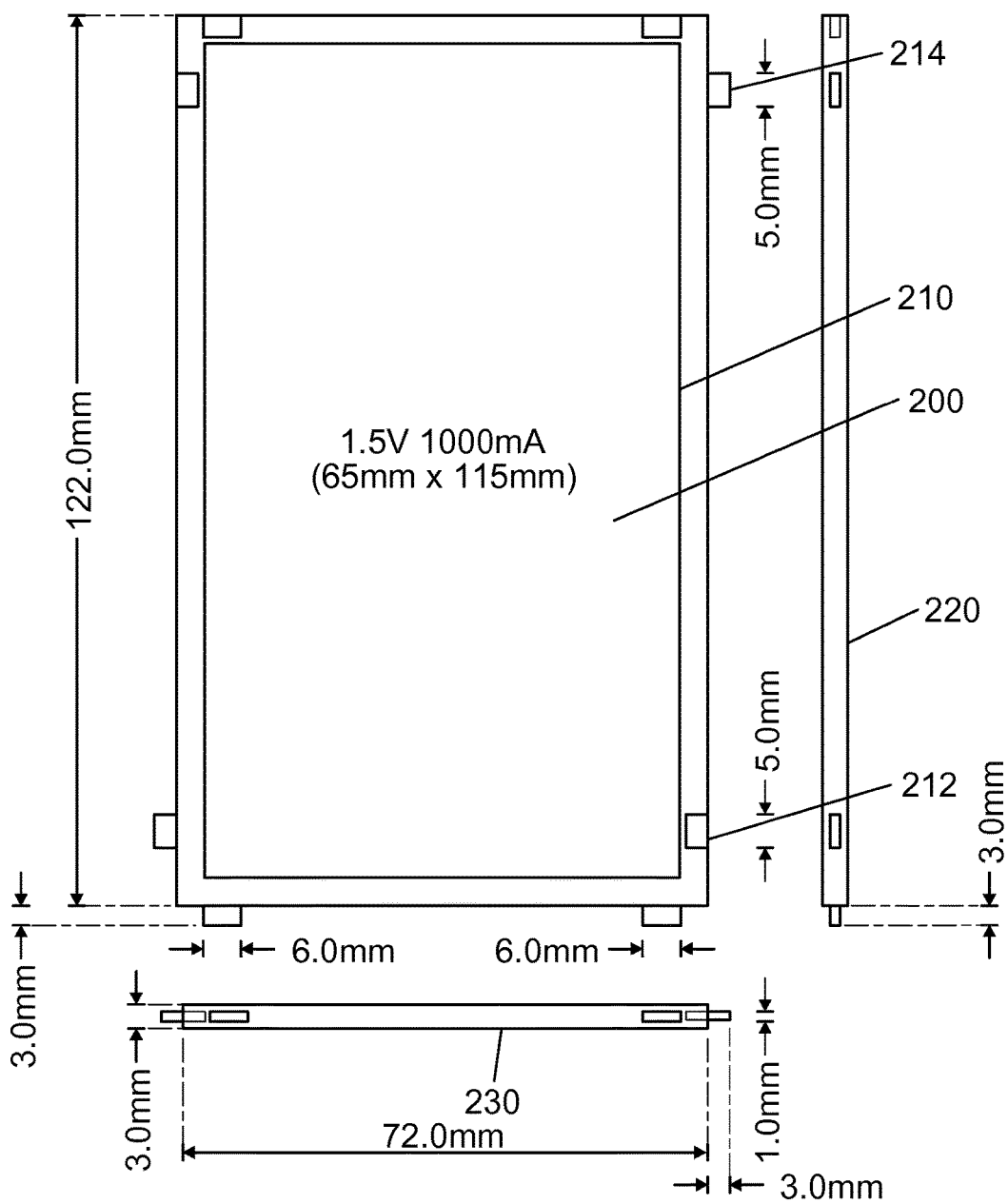
FIG. 2 is a block diagram illustrating another embodiment of a solar rechargeable battery illustrating a top view, a side view, and a bottom side view.

FIG. 2 is a block diagram illustrating another embodiment of a solar rechargeable battery 200 illustrating a top view 210, a side view 220, and a bottom side view 230. Referring to top view 210, solar battery 200 includes another combination of male electrical connectors and female electrical connectors, including, as shown, side female connector 212 and side male connector 214. In one embodiment, a different combination and/or number of male and female electrical connectors are provided for solar battery 200.

Figure 3:
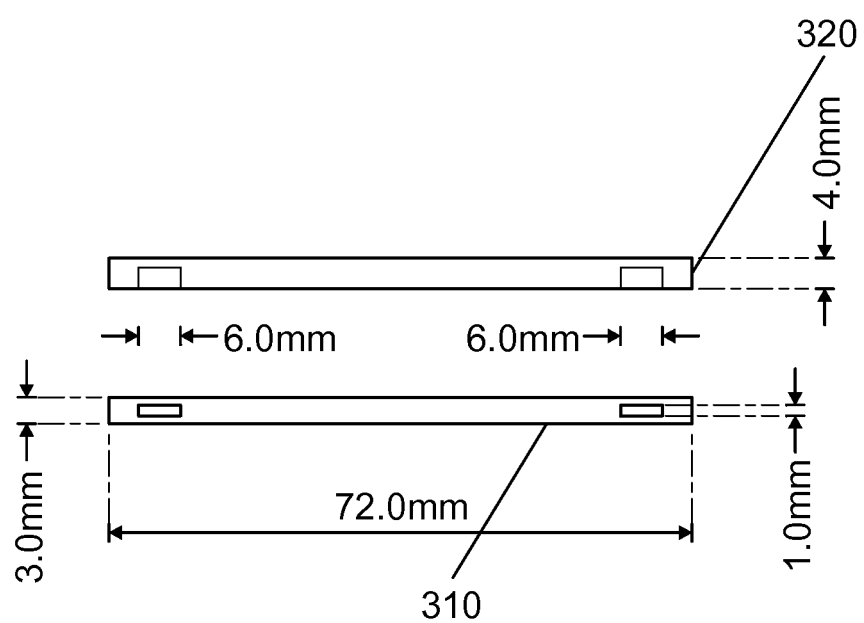
FIG. 3 is a block diagram illustrating an embodiment of an end connector for a solar rechargeable battery.

FIG. 3 is a block diagram illustrating an embodiment of an end connector 320. As shown, end connector 320 provides a female end connector for a solar battery by connecting to bottom side view 310 of a solar battery via the male connectors of the solar battery. In one embodiment, end connector 320 is a mechanical end connector (internally not electrically connected). In one embodiment, end connector 320 is an electrical end connector (internally electrically connected, e.g., an internal serial connection). In one embodiment, end connector 320 provides a male end connector, which connects to female connectors of a solar battery.

Figure 4:
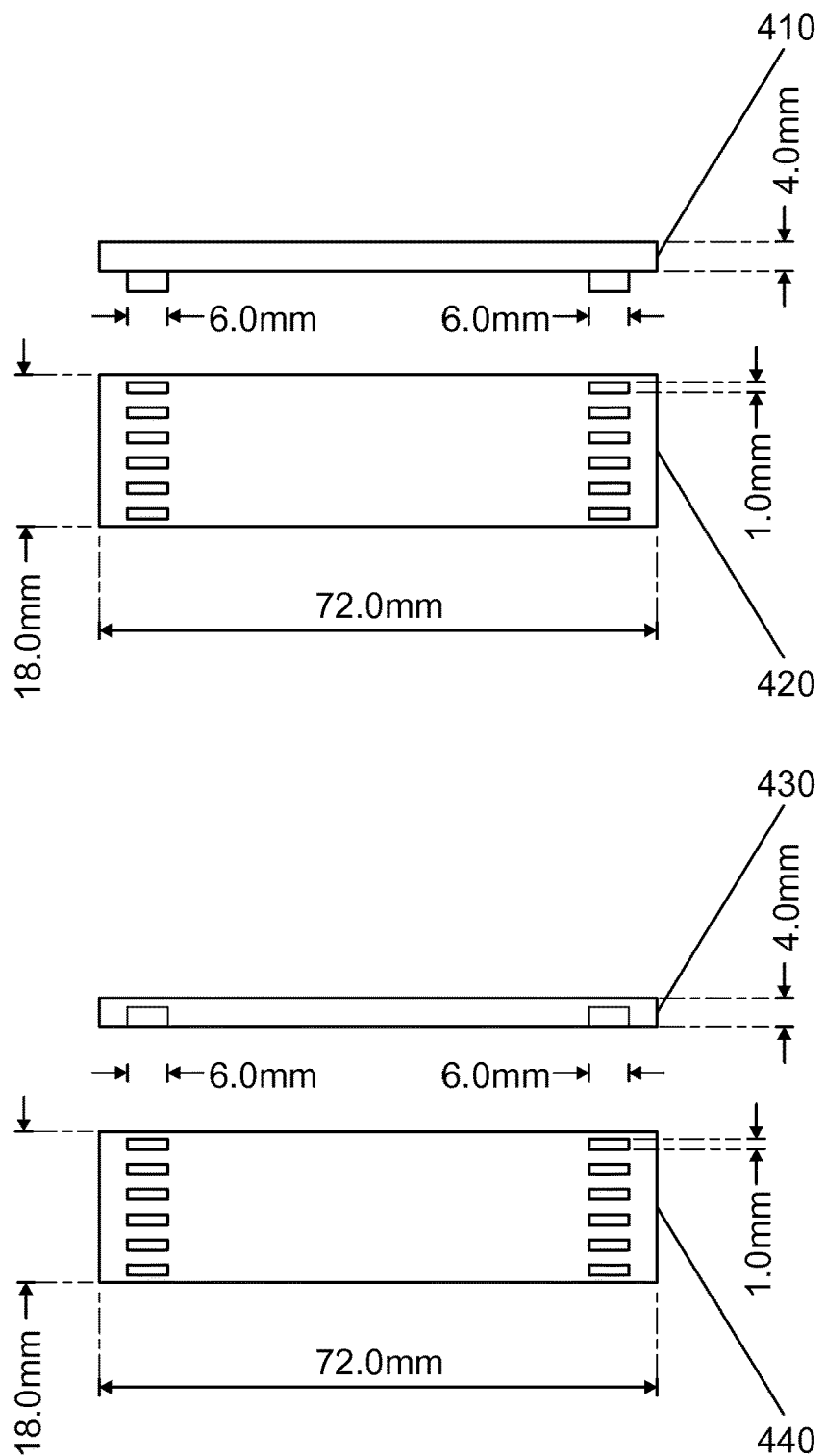
FIG. 4 is a block diagram illustrating an embodiment of a stack connector for solar rechargeable batteries.

FIG. 4 is a block diagram illustrating an embodiment of a stack connector 410 for solar rechargeable batteries. As shown male stack connector 410 allows for up to six solar batteries to be connected in a vertical stack/arrangement using male stack connector 410 providing an internal serial electrical connection. Bottom side view 420 of six stacked solar batteries shows that the six solar batteries are connected via male/female connector combinations using male stack connector 410 to connect to up to six stacked solar batteries using the female electrical connectors of the solar batteries. Also, as shown a tab connector 430 provides a mechanical, female stack connector (internally not electrically connected) that allows for up to six solar batteries to be connected using female tab connector 430. Bottom side view 440 of six stacked solar batteries shows that the solar batteries are connected via female/male connector combinations using tab connector 430 to connect to up to six stacked solar batteries 440 using the male connectors of the solar batteries.

Figure 5:
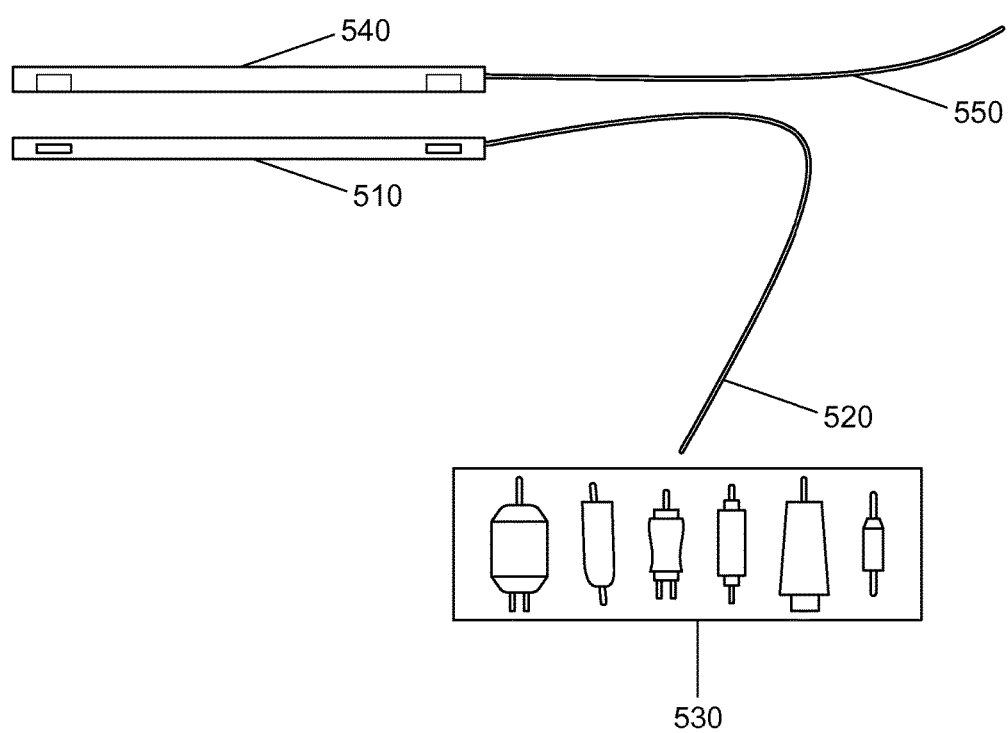
FIG. 5 is a block diagram illustrating an embodiment of a wired end connector for a solar rechargeable battery.

FIG. 5 is a block diagram illustrating an embodiment of a wired end connector 510 for a solar rechargeable battery 520. As shown, wired male end connector 510 includes an electrical wire 520, and attached to the end of the electrical wire 520 is a device connector 530 (e.g., as shown, which can include any of the following types of devices: mobile phone devices such as Sony Ericsson K, Motorola V, Sony Ericsson T, Nokia 8xxxx, Nokia N, and other mobile phone devices, or other device connectors, such as mini USB or USB connectors, including standard or proprietary connectors for laptops, powertools, PDAs, GPS devices, MP3 devices, MP4 devices, DVD devices, etc.). Also, as shown, a wired female end connector 540 includes an electrical wire 550, and in one embodiment, wired female end connector 540 also includes a device connector (e.g., device connector 530). In one embodiment, device connector 530 is a USB connector. In one embodiment, device connector 530 is a mini USB connector. In one embodiment, device connector 530 includes a DC outlet connector for charging the solar rechargeable batteries using a standard, regional compatible DC outlet. In one embodiment, device connector 530 includes a universal device connector plug for connecting a number of different devices using various different proprietary connectors.

Figure 6:
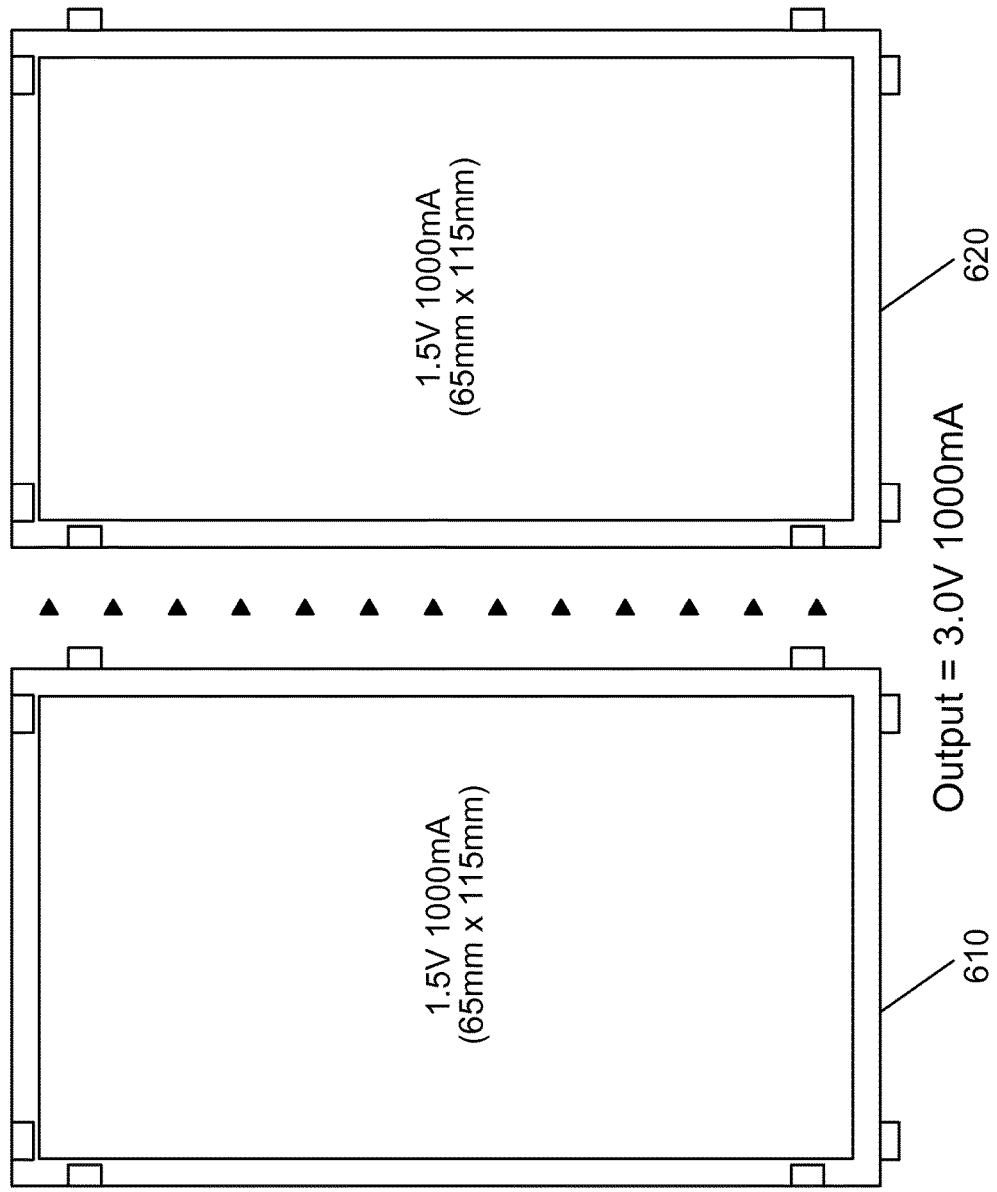
FIG. 6 is a block diagram illustrating an embodiment of two solar rechargeable batteries connected in series.

FIG. 6 is a block diagram illustrating an embodiment of solar rechargeable batteries 610 and 620 connected in series in a planar arrangement. The planar arrangement allows, for example, the solar cells of each battery to recharge the connected batteries by allowing both solar cells to be in direct view of PV input sources. As shown, solar rechargeable battery 610 (e.g., a 1.5V and 1000 mA battery) is connected in series with solar rechargeable battery 620 (e.g., a 1.5V and 1000 mA battery). In particular, the male connectors on the right side of solar battery 610 connect to the female connectors on the left side of solar battery 620 as shown. In this example, the combined output of the in series connected solar batteries 610 and 620 is 3.0V and 1000 mA. In one embodiment, three or more solar batteries are connected in series in a planar arrangement.

Figure 7:
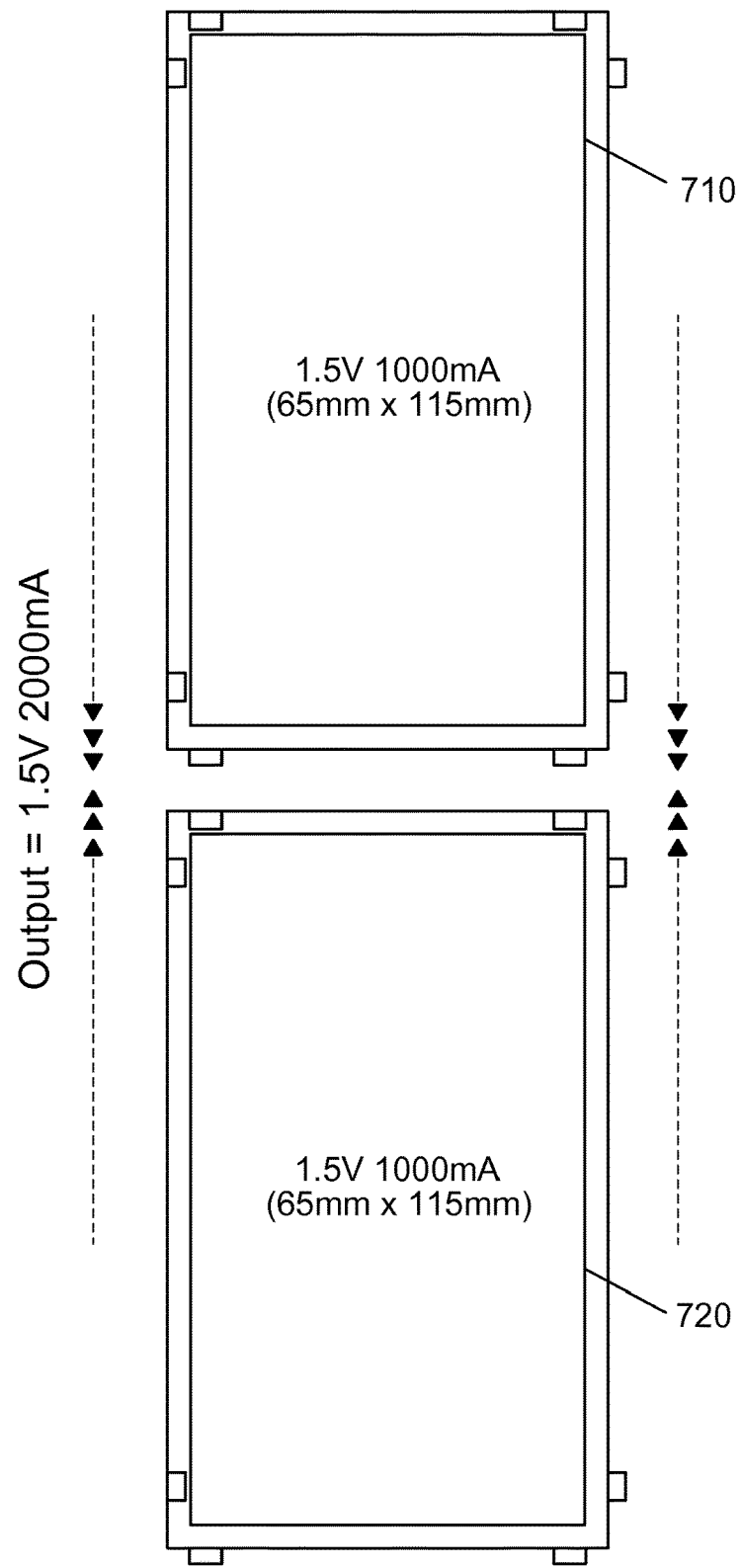
FIG. 7 is a block diagram illustrating an embodiment of two solar rechargeable batteries connected in parallel.

FIG. 7 is a block diagram illustrating an embodiment of solar rechargeable batteries 710 and 720 connected in parallel in a planar arrangement. The planar arrangement allows, for example, the solar cells of each battery to recharge the connected batteries by allowing both solar cells to be in direct view of PV sources. As shown, solar rechargeable battery 710 (e.g., a 1.5V and 1000 mA battery) is connected in parallel with solar rechargeable battery 720 (e.g., a 1.5V and 1000 mA battery). In particular, the male connectors on the bottom side of solar battery 710 connect to the female connectors on the top side of solar battery 720 as shown. In this example, the combined output of the in parallel connected solar batteries 710 and 720 is 1.5V and 2000 mA. In one embodiment, three or more solar batteries are connected in parallel in a planar arrangement. In one embodiment, solar batteries are connected both in parallel and in series in a planar arrangement to allow for all of the solar batteries to be efficiently connected in a planar arrangement for efficient recharging and depending on the desired shape of the connected solar batteries (e.g., for PV purposes and/or surface area/space constraints) and/or for electrical output requirements.

Figure 8:
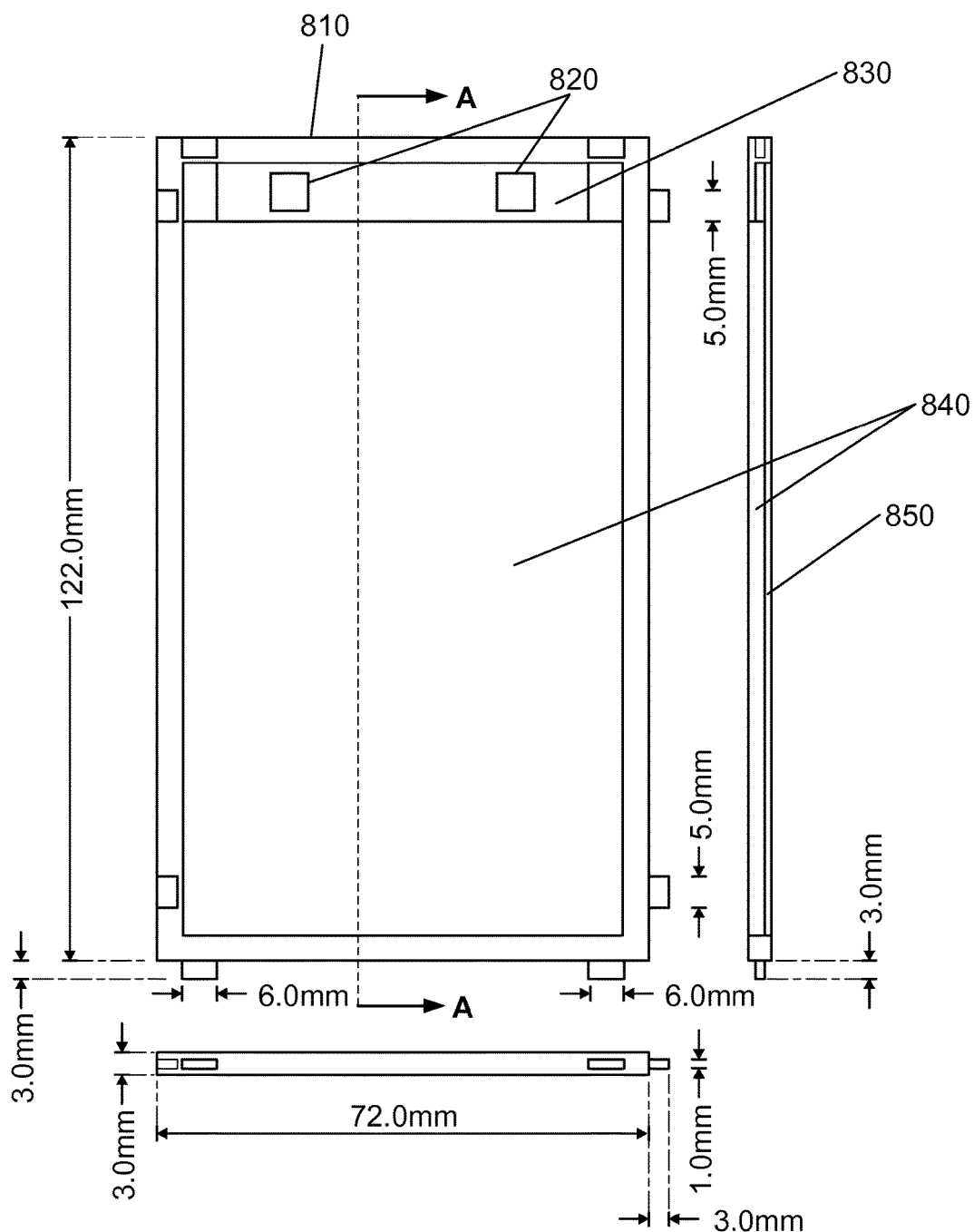
FIG. 8 is a block diagram illustrating an embodiment of a solar rechargeable battery including control processors illustrating a bottom cross-sectional view, a side cross-sectional view, and a bottom side view.

FIG. 8 is a block diagram illustrating an embodiment of a solar rechargeable battery 810 including control processors 820 illustrating a bottom cross-sectional view, a side cross-sectional view, and a bottom side view. As shown, solar battery 810 is a bottom cross-sectional view of a solar rechargeable battery that includes control processors 820 integrated on a printed circuit board (PCB) 830. As shown, solar battery 810 is a Li-polymer (840) battery. Referring to the side cross-sectional view, solar battery 810 also includes a PV cell 850 on the top side of the battery. In one embodiment, control processors 820 are implemented in the end connector (e.g., end connector 320 as shown in FIG. 3). In one embodiment, control processor 820 is implemented as separate circuit elements (e.g., including a buck-boost converter circuit and a zener circuit integrated on a PCB) or as sub-elements of a single integrated circuit, such as an application specific integrated circuit (ASIC), field programmable gate array (FPGA), and the like.

In one embodiment, control processor 820 provides the following features: optimize PV collected to charge the solar battery (e.g., PV range depending on light source and intensity); convert steady state or DC (direct current) from PV cells to triggering (pulsating) charge (e.g., of 1.5V); battery charge level indicator/diode (e.g., the diode can be a low profile LED (green) diode); full cut off; current flow diode (e.g., the diode can be voltage limiting (1.5V) zener circuit); thermal fuse/safety features; and smart recognition of required output voltage and supply accordingly.

Figure 9:
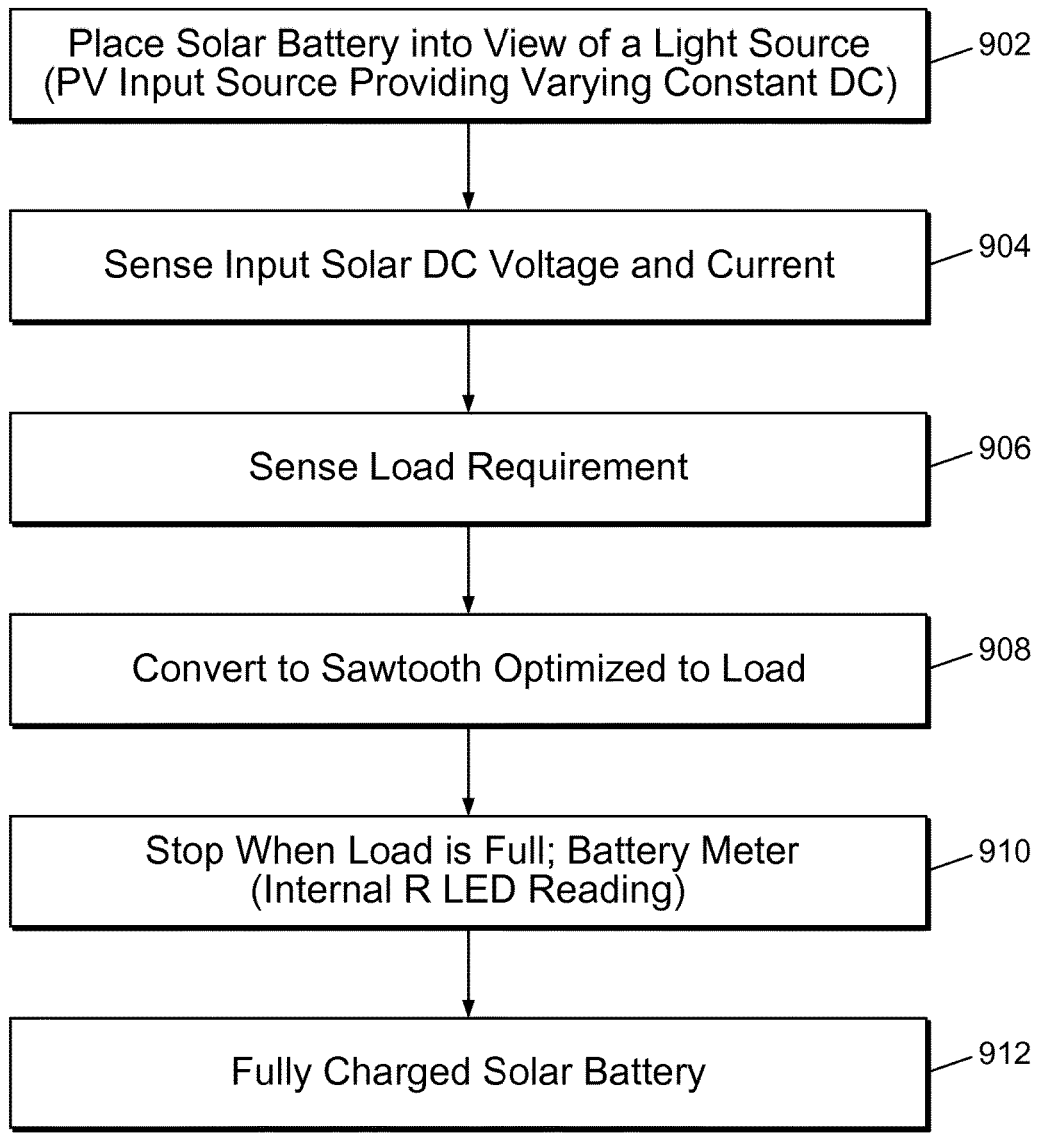
FIG. 9 is a flowchart illustrating an embodiment of a process for recharging solar rechargeable batteries.

FIG. 9 is a flow diagram illustrating an embodiment for recharging a solar rechargeable battery. At 902, a solar battery is placed into view of a light source (e.g., PV input source providing varying constant direct current (DC)). At 904, the solar battery senses an input solar DC voltage and current. At 906, the solar battery senses a load requirement. At 908, the solar battery optimizes the voltage and the current for the load, converting DC to pulsating or sawtooth wave form to charge the solar battery. In one embodiment, the solar battery includes control circuitry that optimizes the peak of RMS voltage of the pulsating output for optimal charging of the battery (load). Also, as the DC voltage from PV varies according to intensity and other factors, the control circuitry converts the varying voltages to constant optimized voltages for charging of the battery in accordance with one embodiment of the present invention. At 910, the solar battery stops when the load is full (e.g., battery meter (internal R LED reading)). At 912, the solar battery is fully charged.

Figure 10:
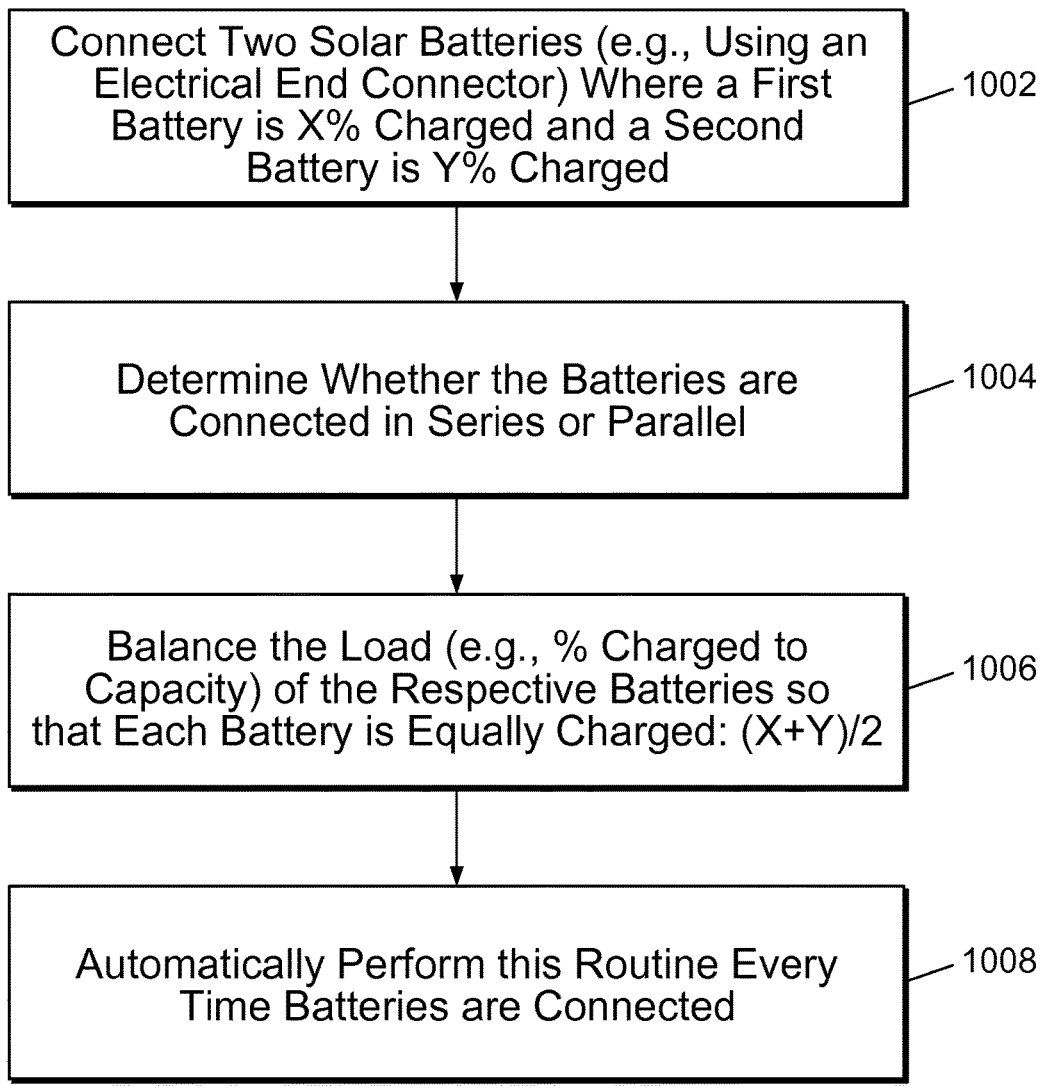
FIG. 10 is a flowchart illustrating an embodiment of a process for balancing the load of electrically connected solar rechargeable batteries.

FIG. 10 is a flowchart illustrating an embodiment of a process for balancing the load of electrically connected solar rechargeable batteries. At 1002, two solar batteries are electrically connected (e.g., using an electrical end connector) in which a first solar battery is X % charged and a second solar battery is Y % charged. At 1004, a control processor determines whether the batteries are connected in series or in parallel. At 1006, the control processor balances the load (e.g., % charged to capacity) of the respective solar batteries so that each battery is equally charged (i.e., (X+Y)/2). At 1008, this routine is automatically performed by the control processor every time the solar batteries are connected.

Figure 11:
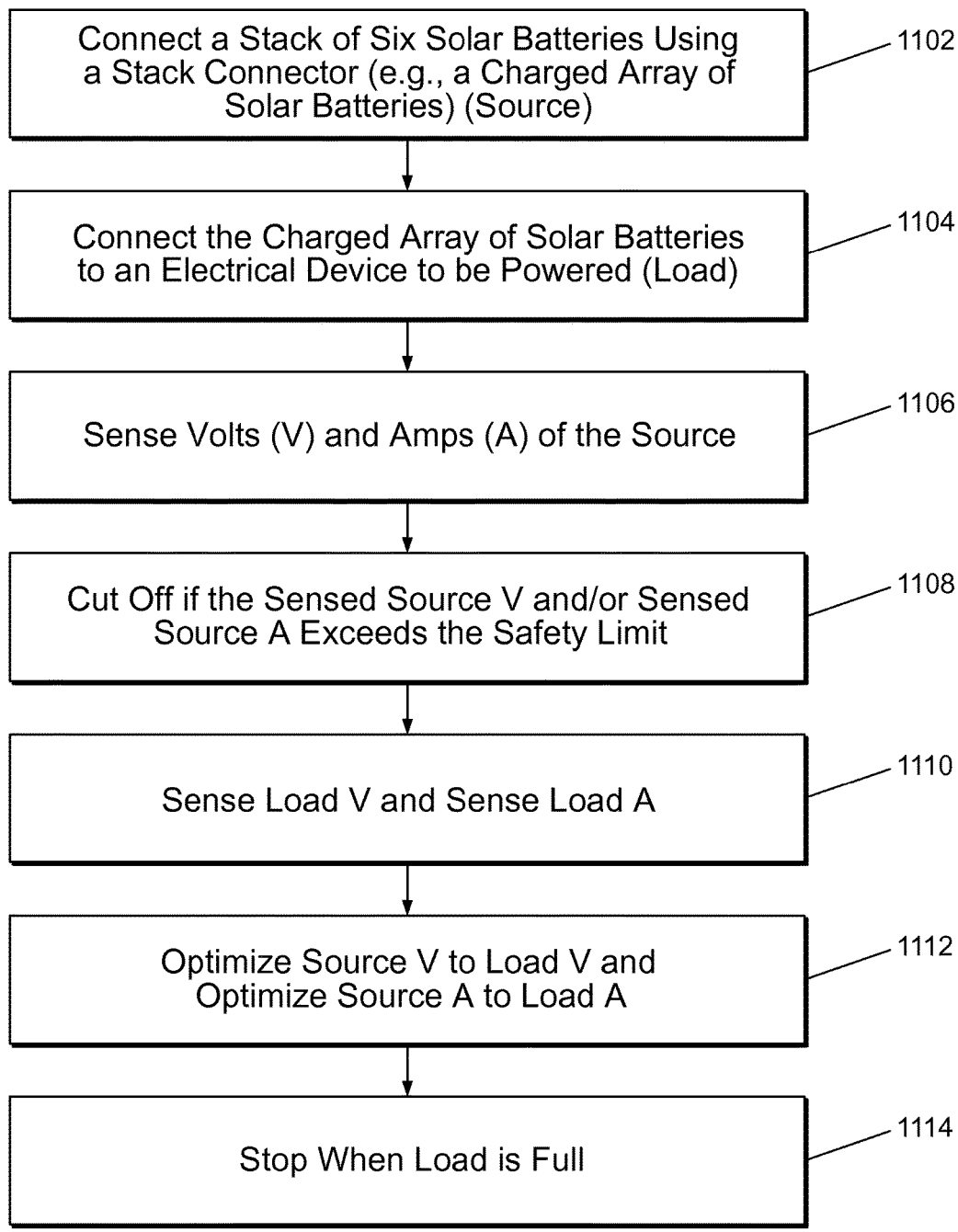
FIG. 11 is a flowchart illustrating an embodiment of a process for an electrically connected array of solar rechargeable batteries.

FIG. 11 is a flowchart illustrating an embodiment of a process for an electrically connected array of solar rechargeable batteries. At 1102, a stack of, for example, six solar batteries is connected using a stack connector (e.g., charged array of solar batteries) (also referred to as the Source). At 1104, the charged array of solar batteries is connected to an electrical device to be powered (also referred to as the Load). At 1106, a control processor senses Volts (V) and Amps (A) of the Source. At 1108, if the sensed Source V and/or sensed Source A exceeds the safety limit, then the control processor cuts off the electrical connection. At 1110, the control processor senses the Load V and senses the Load A. At 1112, Source V is optimized to Load V and Source A is optimized to Load A. At 1114, the process is stopped when the Load is full.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    connecting a plurality of solar rechargeable batteries in a planar arrangement, wherein the plurality of solar rechargeable batteries are electrically connected, wherein each of the plurality of solar rechargeable batteries includes an integrated solar cell and a plurality of interconnections for electrically connecting with the plurality of solar rechargeable batteries in series and in parallel, and wherein the plurality of interconnections include a combination of male and female connectors that allow for electrically connecting the plurality of solar rechargeable batteries in series and in parallel;
    determining whether the plurality of solar rechargeable batteries are connected in series or in parallel;
    balancing the load of the plurality of solar rechargeable batteries so that each of the plurality of solar rechargeable batteries is equally charged; and
    wherein each of the plurality of solar rechargeable batteries is operatively connected standalone to an electrically powered device to power the electrically powered device.

2. The method of claim 1, further comprising:
    connecting the plurality of solar rechargeable batteries in a vertical arrangement, wherein the vertical arrangement provides a charged array of batteries;
    connecting the charged array of batteries to an electrical device to be powered; and
    wherein the plurality of solar rechargeable batteries are connected in a first configuration that includes the planar arrangement of the plurality of solar rechargeable batteries for solar recharging or connected in a second configuration that includes the vertical arrangement of the plurality of solar rechargeable batteries for powering the electrical device.

3. The method of claim 1, further comprising:
    connecting the plurality of solar rechargeable batteries in a vertical arrangement, wherein the vertical arrangement provides a charged array of batteries;
    connecting the charged array of batteries to the electrically powered device to be powered, wherein the plurality of solar rechargeable batteries are connected in a first configuration that includes the planar arrangement of the plurality of solar rechargeable batteries for solar recharging or connected in a second configuration that includes the vertical arrangement of the plurality of solar rechargeable batteries for powering the electrical device sensing a source voltage and a source amps;
    cutting off an electrical connection if the source voltage exceeds a first safety limit;
    cutting off the electrical connection if the source amps exceeds a second safety limit;
    sensing a load voltage and a load amps; and
    optimizing the source voltage to the load voltage and optimizing the source amps to the load amps, wherein the electrical connection is maintained until the load is full.

4. The method of claim 1, wherein the plurality of solar rechargeable batteries includes a first solar rechargeable battery and a second solar rechargeable battery, wherein the first solar rechargeable battery and the second solar rechargeable battery are connected in a first configuration that includes the planar arrangement of the first battery and the second battery for solar recharging or connected in a second configuration that includes a vertical arrangement of the first solar rechargeable battery and the second solar rechargeable battery for powering the electrically powered device, and wherein each of the first solar rechargeable battery and the second solar rechargeable battery is operatively connected standalone to the electrically powered device to power the electrically powered device.

5. The method of claim 4, wherein the plurality of solar rechargeable batteries includes a third solar rechargeable battery, wherein the first solar rechargeable battery, the second solar rechargeable battery, and the third solar rechargeable battery are connected in a third configuration that includes the planar arrangement of the first solar rechargeable battery, the second solar rechargeable battery, and the third solar rechargeable battery for solar recharging or connected in a fourth configuration that includes a vertical arrangement of the first solar rechargeable battery, the second solar rechargeable battery, and the third solar rechargeable battery for powering the electrically powered device.

6. The method of claim 1, wherein the plurality of solar rechargeable batteries is operatively connected in the planar arrangement for powering the electrically powered device.

7. The method of claim 1, wherein each of the plurality of solar rechargeable batteries comprises a flexible material.

8. The method of claim 1, wherein the plurality of solar rechargeable batteries is operatively interconnected in a tiled arrangement, and wherein each of the plurality of solar rechargeable batteries comprises a flexible material.

9. The method of claim 1, wherein each of the plurality of solar rechargeable batteries includes a control processor, wherein the control processor converts a direct current from a photovoltaic cell to a pulsating charge and determines an output voltage.

10. The method of claim 1, wherein each of the plurality of solar rechargeable batteries includes a control processor, wherein the control processor converts a direct current from a photovoltaic cell to a pulsating charge and determines an output voltage, wherein the control processor optimizes photovoltaic energy collected to charge the plurality of solar batteries that are electrically connected, and wherein the control processor selects a voltage output when connected to the electrically powered device to power the electrically powered device.

11. The method of claim 1, wherein the plurality of solar rechargeable batteries are each a size no greater than that of an ISO standard credit card size package.

12. The method of claim 1, wherein the plurality of solar rechargeable batteries are electrically connected to an electrical device selected from the group of a computer, a cell phone, a PDA, a portable video game system, a music player, a DVD player, a GPS device, and a wireless headset.

13. The method of claim 1, wherein the plurality of solar rechargeable batteries is electrically connected to the electrically powered device using an end connector.

14. The method of claim 1, wherein the plurality of solar rechargeable batteries are electrically connected to the electrically powered device using an electrical end connector, the electrical end connector including a wire connecting a universal device connector plug for connecting a plurality of devices using a plurality of proprietary connectors.

15. The method of claim 1, wherein the plurality of solar rechargeable batteries are electrically connected to the electrically powered device using an electrical end connector, the electrical end connector for providing an electrical connection to the plurality of solar rechargeable batteries for connecting plurality of solar rechargeable batteries to the electrically powered device, wherein the plurality of solar rechargeable batteries are connected in the planar arrangement.

16. The method of claim 1, wherein the plurality of solar rechargeable batteries are electrically connected to the electrically powered device using an electrical end connector, the electrical end connector for providing an electrical connection to the plurality of solar rechargeable batteries for connecting plurality of solar rechargeable batteries to the electrically powered device for recharging the electrically powered device, wherein the plurality of solar rechargeable batteries are connected in the planar arrangement.

17. The method of claim 1, wherein the plurality of solar rechargeable batteries are electrically connected to the electrically powered device using an electrical end connector, the electrical end connector including a connector selected from the group of a mini USB connector, a USB connector, a cell phone connector, a computer connector, a music player connector, a GPS device connector, a Bluetooth headset connector, a DVD player connector, a DC outlet connector, and a universal device connector plug for connecting a plurality of devices using a plurality of proprietary connectors.

* * * * *

UNITED STATES PATENT AND TRADEMARK OFFICE
CERTIFICATE OF CORRECTION

PATENT NO. : 10,298,053 B2  
APPLICATION NO. : 14/956734  
DATED : May 21, 2019  
INVENTOR(S) : Chang et al.

Page 1 of 1

It is certified that error appears in the above-identified patent and that said Letters Patent is hereby corrected as shown below:

In the Claims

In Column 8, Claim 15, Line 15, after "connecting" insert --the--.

In Column 8, Claim 16, Line 24, after "connecting" insert --the--.

Signed and Sealed this  
Fifth Day of November, 2019

Andrei Iancu  
*Director of the United States Patent and Trademark Office*